(12) United States Patent
Rice

(10) Patent No.: US 7,866,164 B2
(45) Date of Patent: Jan. 11, 2011

(54) COOLING AND HEATING SYSTEMS AND METHODS UTILIZING THERMO-ELECTRIC DEVICES

(75) Inventor: Douglas T. Rice, Veradale, WA (US)

(73) Assignee: TAC Unit, LLC, Otis Orchards, WA (US)

( * ) Notice: Subject to any disclaimer, the term of this patent is extended or adjusted under 35 U.S.C. 154(b) by 71 days.

(21) Appl. No.: 12/014,786

(22) Filed: Jan. 16, 2008

(65) Prior Publication Data

US 2008/0110179 A1   May 15, 2008

Related U.S. Application Data

(63) Continuation of application No. 11/242,189, filed on Oct. 3, 2005, now abandoned.

(60) Provisional application No. 60/616,678, filed on Oct. 7, 2004.

(51) Int. Cl.
*F25B 21/02* (2006.01)

(52) U.S. Cl. .................. 62/3.3; 62/3.7; 62/259.3

(58) Field of Classification Search ............ 62/3.2, 62/3.3, 3.61, 3.7, 259.3, 314, 419, 434; 165/42, 165/62, 108, 132, 202, 80.5; 136/203, 204
See application file for complete search history.

(56) References Cited

U.S. PATENT DOCUMENTS

| | | |
|---|---|---|
| 3,205,667 A | 9/1965 | Frantti |
| 3,236,056 A * | 2/1966 | Phillips et al. ........ 62/3.61 |
| 3,315,474 A | 4/1967 | Farer |
| 3,355,900 A | 12/1967 | De Coye De Castelet |
| 3,392,535 A | 7/1968 | De Coye De Castelet |
| 3,931,532 A | 1/1976 | Byrd |
| 3,956,902 A | 5/1976 | Fields, Jr. |
| 4,182,129 A | 1/1980 | Haunold et al. |
| 4,280,330 A | 7/1981 | Harris et al. |
| 4,753,682 A | 6/1988 | Cantoni |
| 4,858,676 A | 8/1989 | Bolfik et al. |

(Continued)

FOREIGN PATENT DOCUMENTS

EP   0 424 160 A1   4/1991

(Continued)

OTHER PUBLICATIONS

Abstract to SU 1599575 A to Bobyr et al.*

(Continued)

*Primary Examiner*—Mohammad M Ali
(74) *Attorney, Agent, or Firm*—Malhotra Law Firm, PLLC; Deepak Malhotra

(57) ABSTRACT

In one embodiment, a cooling and heating system includes a heat exchanger, a thermoelectric cooler coupled to the heat exchanger and operable to cool or heat a fluid within the heat exchanger, a heat transfer device, an input conduit coupled between the heat exchanger and the heat transfer device, a return conduit coupled between the heat exchanger and the heat transfer device, and a pump operable to transport the fluid through the input conduit, the heat exchanger, the return conduit, and the heat transfer device. Thermal energy existing within the fluid, while flowing through the heat transfer device, is utilized to heat or cool an environment adjacent the heat transfer device.

19 Claims, 2 Drawing Sheets

U.S. PATENT DOCUMENTS

| | | | |
|---|---|---|---|
| 4,955,203 A | 9/1990 | Sundhar | |
| 5,117,638 A | 6/1992 | Feher | |
| 5,154,661 A | 10/1992 | Higgins | |
| 5,275,001 A * | 1/1994 | Yokotani et al. | 62/3.7 |
| 5,427,174 A * | 6/1995 | Lomolino et al. | 165/104.13 |
| 5,450,894 A | 9/1995 | Inoue et al. | |
| 5,711,155 A | 1/1998 | DeVilbiss et al. | |
| 5,732,856 A | 3/1998 | Fry | |
| 5,871,526 A | 2/1999 | Gibbs et al. | |
| 5,901,572 A | 5/1999 | Peiffer et al. | |
| 5,931,001 A | 8/1999 | Watanabe et al. | |
| 6,119,767 A * | 9/2000 | Kadota et al. | 165/104.33 |
| 6,226,994 B1 * | 5/2001 | Yamada et al. | 62/3.7 |
| 6,260,376 B1 | 7/2001 | Khelifa et al. | |
| 6,272,873 B1 | 8/2001 | Bass | |
| 6,295,819 B1 | 10/2001 | Mathiprakasam et al. | |
| 6,430,935 B1 | 8/2002 | Klett et al. | |
| 6,434,955 B1 | 8/2002 | Ng et al. | |
| 6,453,678 B1 | 9/2002 | Sundhar | |
| 6,575,230 B1 * | 6/2003 | Kadota et al. | 165/104.33 |
| 6,598,404 B2 | 7/2003 | Krulp | |
| 6,662,572 B1 | 12/2003 | Howard | |
| 6,705,089 B2 | 3/2004 | Chu et al. | |
| 6,826,916 B2 * | 12/2004 | Shimada et al. | 62/3.2 |
| 6,880,346 B1 | 4/2005 | Tseng et al. | |
| 7,104,313 B2 | 9/2006 | Pokharna et al. | |
| 7,104,331 B2 | 9/2006 | Bussear et al. | |
| 7,106,957 B2 * | 9/2006 | Abras et al. | 392/480 |
| 7,218,523 B2 | 5/2007 | Hamman | |
| 2002/0134200 A1 | 9/2002 | Nishimura et al. | |
| 2002/0173264 A1 | 11/2002 | Ottman et al. | |
| 2003/0029175 A1 | 2/2003 | Lee | |
| 2003/0136134 A1 | 7/2003 | Pun | |
| 2003/0145605 A1 | 8/2003 | Moon et al. | |
| 2004/0025516 A1 | 2/2004 | Van Winkle | |
| 2004/0121719 A1 | 6/2004 | Robinson et al. | |

FOREIGN PATENT DOCUMENTS

| | | | |
|---|---|---|---|
| EP | 0 952 017 A2 | | 10/1999 |
| EP | 1 388 444 A1 | | 2/2004 |
| EP | 1 429 089 A2 | | 6/2004 |
| JP | 10-35268 A | | 2/1998 |
| SU | 1599575 A | * | 10/1990 |
| WO | WO 95/14899 A1 | | 6/1995 |
| WO | WO 97/16633 A1 | | 5/1997 |
| WO | WO 99/30090 A1 | | 6/1999 |
| WO | WO 02/055939 A1 | | 7/2002 |
| WO | WO 02/069014 A1 | | 9/2002 |
| WO | WO 02/080270 A1 | | 10/2002 |
| WO | WO 03/027575 A2 | | 4/2003 |
| WO | WO 03/046462 A2 | | 6/2003 |

OTHER PUBLICATIONS

PCT International Search Report and Written Opinion (ISA/US) for PCT/US2005/36344.

* cited by examiner

COOLING AND HEATING SYSTEMS AND METHODS UTILIZING THERMO-ELECTRIC DEVICES

RELATED APPLICATIONS

This is a continuation of U.S. patent application Ser. No. 11/242,189 filed Oct. 3, 2005, titled "Air-Conditioning and Heating System Utilizing Thermo-Electric Solid State Devices," incorporated herein by reference, which in turn claims priority from U.S. Provisional Application Ser. No. 60/616,678 filed Oct. 7, 2004.

TECHNICAL FIELD

The technical field comprises heating and cooling systems, as well as closed-loop air-conditioning and heating system utilizing thermoelectric solid state devices.

BACKGROUND

Conventional air conditioner systems in automobiles include many moving parts, including compressors, condensers, and evaporators. The compressor is typically driven by a belt coupled to the automobile's engine. Hence, the engine needs to be operating when cool air is desired within the vehicle, which wastes considerable fuel and causes further pollution of the atmosphere. In addition, these moving parts, including the engine, are noisy and are subject to wear and tear.

DETAILED DESCRIPTION

Figure 1:
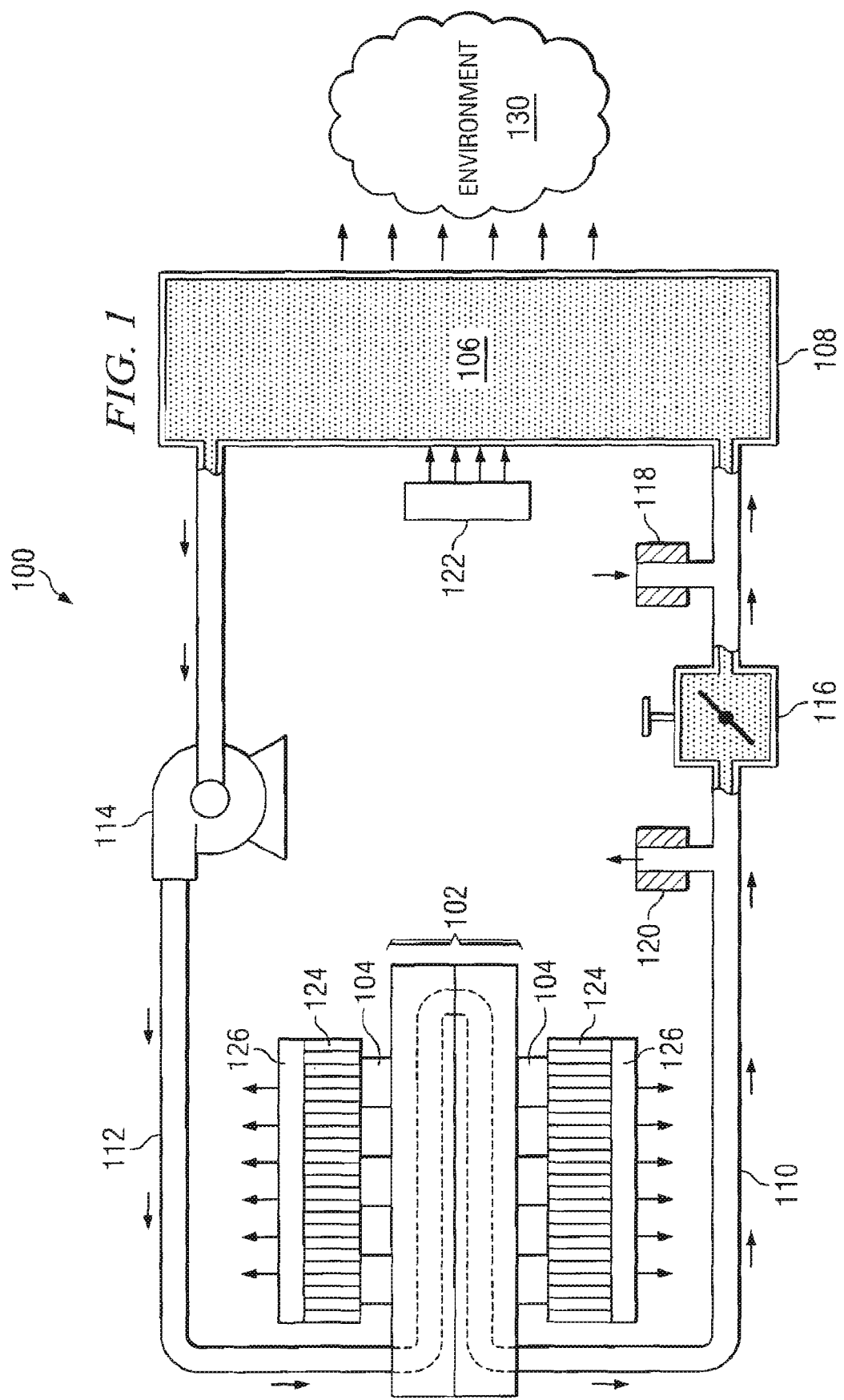
FIG. 1 is a schematic of a cooling and heating system according to one embodiment of the invention.

FIG. 1 is a schematic of a cooling and heating system 100 according to one embodiment of the invention. System 100 may be utilized in any suitable application, such as automotive applications, medical device applications, or other suitable applications that require the cooling or heating of an environment 130, as described in greater detail below. In the illustrated embodiment, system 100 includes an input conduit 110, a heat transfer device 108, a return conduit 112, and a heat exchanger 102 that collectively form a closed-loop system. In other embodiments, however, system 100 may be an open-loop system. System 100 also includes one or more thermoelectric coolers ("TECs") coupled to heat exchanger 102 and operable to cool or heat a fluid 106 flowing through system 100, a shutoff valve 116, an input coupler valve 118, a bleeder valve 120, a fan 122, a heat transfer structure 124, and a fan 126. The present invention contemplates more, fewer, or different components than those illustrated in FIG. 1.

Heat exchanger 102 is described in greater detail below in conjunction with FIG. 2. Generally, heat exchanger 102 includes a passageway therein that allows fluid 106 to flow therethrough while being cooled or heated by thermal energy generated from TECs 104. TECs 104 may be any thermoelectric coolers that are operable to cool or heat fluid 106 within heat exchanger 102. TECs 104 may couple to an outside surface of heat exchanger 102 in any suitable manner. Any suitable number and type of TECs 104 is contemplated by the present invention depending on the desired amount of cooling or heating of fluid 106 flowing through heat exchanger 102.

Heat transfer structure 124 is coupled to TECs 104 and is operable to remove thermal energy from TECs 104. For example, during operation of TECs 104, the sides of TECs 104 that are coupled to heat exchanger 102 may be cooling fluid 106 within heat exchanger 102. In this case, it is desirable for heat to be removed from the opposite sides of TECs 104 in order to increase the efficiency of TECs 104. Therefore, heat transfer structure 124 is operable to aid in removing heat from TECs 104. Any suitable heat transfer structure is contemplated by the present invention, such as a finned structure. To aid in removing heat from TECs 104, optional fan 126 may be coupled to or positioned adjacent heat transfer structure 124 to force air over heat transfer structure 124. Any suitable fan 126 is contemplated. In other embodiments, other suitable additional cooling methods for heat transfer structure 124 are contemplated by the present invention, such as running a fluid through heat transfer structure 124.

Heat transfer device 108 may be any suitable device or structure that is utilized to cool or heat environment 130 as a result of the thermal energy contained in fluid 106 flowing through heat transfer device 108. Heat transfer device 108 may be any suitable size and shape and may take any suitable form depending on the application for system 100. For example, heat transfer device 108 may be a radiator of an automobile or a medical device that is coupled to a limb of a patient. In another automotive application, heat transfer device 108 may function as a heater core that is utilized to cool or heat the inside of an automobile or other suitable vehicle by forcing air over heat transfer device 108 via fan 122, which may be any suitable fan. Other applications for heat transfer device 108 are contemplated, and the thermal energy of fluid 106 flowing through heat transfer device 108 may be utilized in any suitable manner to cool or heat environment 130.

Both input conduit 110 and return conduit 112 may be any suitable conduits operable to transport fluid 106 therethrough. Conduits 110 and 112 may be any suitable length and any suitable diameter. Conduits 110 and 112 may be rigid conduits, flexible conduits, or a combination of rigid and flexible conduits. For example, a portion of conduit 110 and/or conduit 112 may be manufactured from high pressure flex hose. Any suitable coupling methods may be utilized to couple conduits 110 and 112 to respective components of system 100.

Pump 114 is utilized to circulate fluid 106 through system 100. Any suitable pump is contemplated by the present invention. In one particular embodiment of the invention, pump 114 is a magnetic pump and is coupled to return conduit 112. However, pump 114 may also be coupled to input conduit 110. Any suitable size pump is contemplated by the present invention.

Fluid 106 may be any suitable fluid. In a preferred embodiment, fluid 106 is a combination of glycol and distilled water. However, other suitable glycol-base fluids are contemplated. In other embodiments, water, antifreeze, or ethanol with a water base and water wetter dispersant may be utilized for fluid 106. Fluid 106 may be injected or otherwise introduced into system 100 via input coupler valve 118, which may be coupled to input conduit 110 in any suitable manner.

Bleeder valve 120 may be used to purge system 100 of all air during the fluid input injection process. As fluid 106 is injected into system 100 via input coupler valve 118, bleeder valve 120 allows the air in system 100 to be bled off until all air is purged and there is a constant flow of fluid 106, at which time bleeder valve 120 is then closed. The air and fluid 106 being bled off comes from the output of heat exchanger 102. Shutoff valve 116 is used to prevent any backflow of air or fluid 106 into bleeder valve 120 during the fluid input injection process. Shutoff valve 116 is closed off, which allows the air and fluid 106 to follow the flow indicated by the arrows. Once system 100 is charged (all air is purged), shutoff valve 116 is then opened to allow complete unrestricted closed-loop flow through system 100.

Although not illustrated in FIG. 1, in order for TECs 104 to cool or heat fluid 106 flowing through heat exchanger 102, power must be delivered to TECs 104. This power may originate from any suitable power source and may be any suitable power level. For example, a suitable DC current may be delivered to TECs 104 to cool or heat fluid 106 flowing through heat exchanger 102 depending upon the polarity of the DC current. Also not illustrated in FIG. 1, a thermostat controller module may be coupled to TECs 104 in order to control the temperature of the sides of TECs 104 that are in contact with heat exchanger 102. Any suitable thermostat controller module is contemplated.

Figure 2:
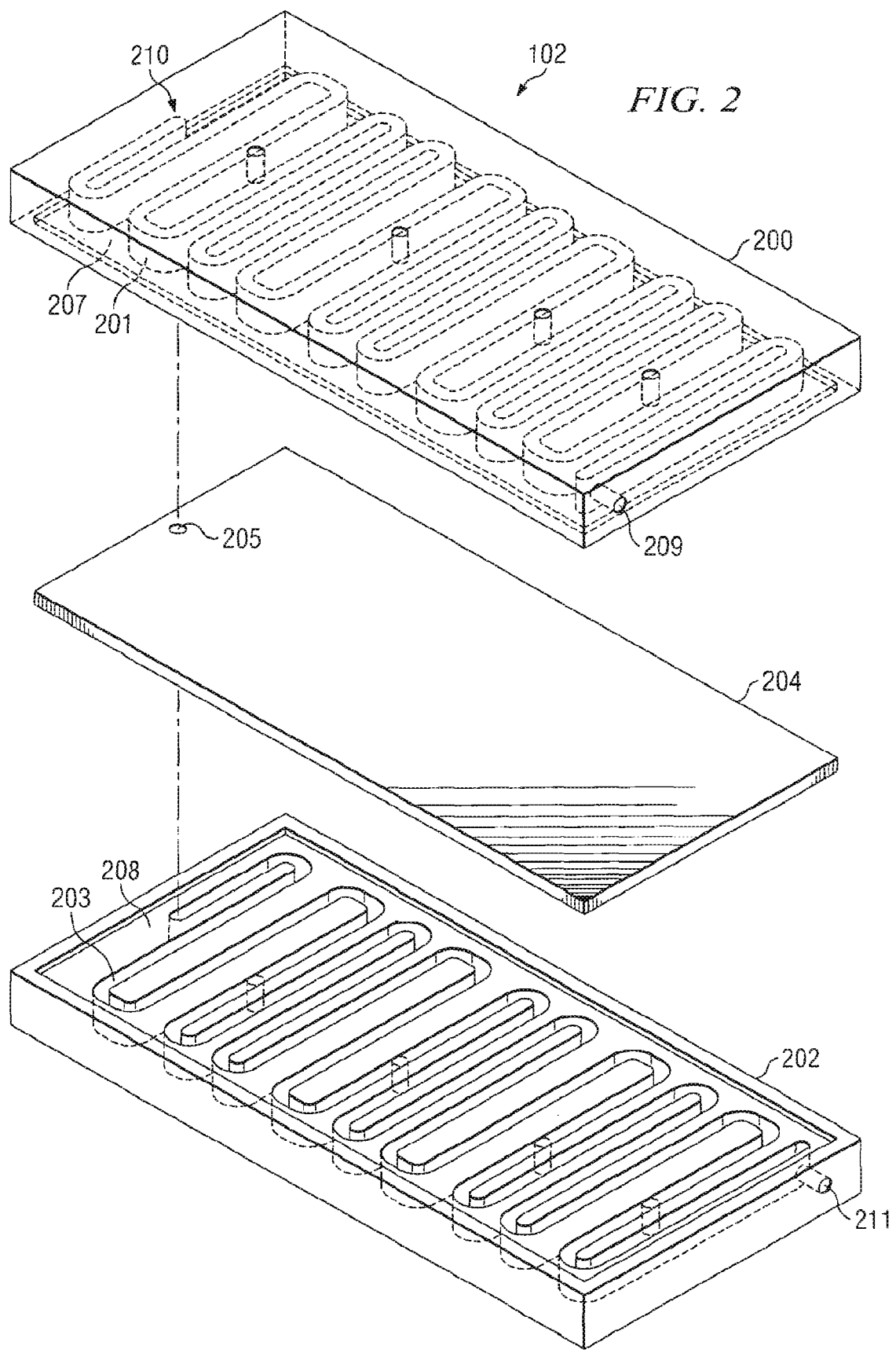
FIG. 2 is a schematic of a heat exchanger for use in the system of FIG. 1 according to one embodiment.

FIG. 2 is a schematic of heat exchanger 102 according to one embodiment of the invention. In the embodiment illustrated in FIG. 2, heat exchanger 102 comprises an upper section 200 having a first passageway 201 and a lower section 202 having a second passageway 203. A metal plate 204 is sandwiched between upper section 200 and lower section 202.

Heat exchanger 102 may have any suitable size and shape and may be formed from any suitable material. For example, in the embodiment illustrated in FIG. 2, both upper section 200 and lower section 202 are formed from a suitable metal, such as aluminum having any suitable thickness. In the illustrated embodiment, the thickness of both upper section 200 and lower section 202 is approximately one inch. Upper portion 200 and lower portion 202 have recesses 207, 208 respectively, for accepting metal plate 204. Recesses 207, 208 preferably match the contour of metal plate 204. In addition, the depth of recesses 207, 208 is preferably approximately half the thickness of metal plate 204. Therefore, when metal plate 204 is sandwiched between upper section 200 and lower section 202 then upper section 200 and lower section 202 may be coupled to one another around their perimeters. For example, any suitable coupling method is contemplated, such as welding.

Passageways 201, 203 formed in upper section 200 and lower section 202, respectively, may have any suitable configuration and any suitable volume. In the illustrated embodiment, passageways 201, 203 take the form of a serpentine configuration for fluid 106 to flow therethrough. Passageways 201 and 203 are coupled to one another by a hole 205 formed in one end of metal plate 204.

Metal plate 104 may be any suitable size and shape and may be formed from any suitable metal, such as copper. Metal plate 104 may also have any suitable thickness, such as ¼ inch. Each of the passageways 201, 203 are in contact with respective sides of metal plate 204 so that fluid 106 flowing through passageways 201, 203 contact metal plate 204. This allows metal plate 204 to absorb thermal energy from fluid 106 flowing through upper portion 200 and transfer some of that thermal energy to the fluid 106 when it flows through passageway 203 of lower section 202.

In one embodiment, fluid 106 enters passageway 201 via opening 209 in upper section 200. Fluid 106 then flows through passageway 201 until it gets to an end 210 of passageway 201 before traveling through hole 205 down to passageway 203. Fluid 106 then travels through passageway 203 until reaching an outlet opening 211 in bottom section 202. As fluid 106 flows through passageway 201, TECs 104 either cool or heat fluid 106. Some of the thermal energy from fluid 106 as it flows through passageway 201 is absorbed by metal plate 204 so that as the fluid flows through passageway 203 in bottom section 202 the fluid 106 is not only cooled or heated by thermoelectric coolers 104 coupled to bottom section 202, but also cooled or heated from the thermal energy existing within metal plate 204.

Referring back to FIG. 1, in one embodiment of the invention where fluid 106 is utilized to cool environment 130, fluid 106 is injected into system 100 via input coupler valve 118. Pump 114 is used to circulate 106 through system 100. Fluid 106 enters heat exchanger 102 where it is cooled by thermoelectric coolers 104 as described above in conjunction with FIG. 2. Heat transfer structure 124 with or without fan 126 is utilized to remove heat from the outside surfaces of TECs 104 in order to increase the efficiency of TECs 104. The fluid exits heat exchanger 102 and travels through input conduit 110 to heat transfer device 108. Fluid 106 flows through heat transfer device 108 in order to cool environment 130 with or without the help of fan 122. Fluid 106 is then returned to heat exchanger 102 via return conduit 112. Fluid 106 then continually travels through this closed loop system 100.

Thus, system 100 in one embodiment is a closed-loop cooling and heating system that includes thermoelectric coolers 104 that cool or heat fluid flowing through system 100. It is a Freon™-free, non-pressurized system that is based on electronics and is used to cool or heat an environment. System 100 may be utilized in any suitable environment and application. For example, system 100 may be utilized in an environment having an ambient temperature of somewhere between −10° F. and +120° F. As described above, any suitable number of applications is contemplated by the present invention, such as automotive applications, medical device applications, or other suitable applications.

Although embodiments of the invention and their advantages are described in detail, a person skilled in the art could make various alterations, additions, and omissions without departing from the spirit and scope of the present invention as defined by the appended claims.

I claim:

1. A cooling and heating system, comprising:
   a heat exchanger including a first section having a first passageway, including a second section having a second passageway, and including a plate, the first and second passageways being separated by the plate, the plate having an aperture therethrough and the first passageway being in fluid communication with the second passageway via the aperature, the first section having a first side facing the second section and having a second side facing away from the second section, and the second section having a first side facing the first section and having a second side facing away from the first section;
   a thermoelectric cooler coupled to the second side of the first section of the heat exchanger and which is selectively operable to cool or heat a fluid within the first section of the heat exchanger;
   a thermoelectric cooler coupled to the second side of the second section of the heat exchanger and which is selectively operable to cool or heat a fluid within the second section of the heat exchanger, wherein it is possible to simultaneously cool or heat fluid in both the first and second sections;
   a heat transfer device thermally coupled to the first mentioned thermoelectric cooler;
   a fan adjacent the heat transfer device and which is selectively operable to force air relative to the heat transfer device, wherein the fan affects cooling or heating of the fluid within the first section of the heat exchanger;
an input conduit coupled between the heat exchanger and the heat transfer device;
a return conduit coupled between the heat exchanger and the heat transfer device; and
a pump which is selectively operable to circulate the fluid through the input conduit, the heat exchanger, the return conduit, and the heat transfer device;
wherein thermal energy existing within the fluid while flowing through the heat transfer device is utilized to heat or cool an environment adjacent the heat transfer device.

2. The cooling and heating system of claim 1, further comprising a second heat transfer device thermally coupled to the second mentioned thermoelectric cooler; and a fan adjacent the second heat transfer device and which is selectively operable to force air over the second heat transfer device.

3. The cooling and heating system of claim 1, further comprising a finned heat transfer structure, external of the heat exchanger, coupled to the second mentioned thermoelectric cooler and which is selectively operable to remove thermal energy from the first mentioned thermoelectric cooler.

4. The cooling and heating system of claim 3, further comprising a fan adjacent the finned heat transfer structure and which is selectively operable to force air over the heat transfer structure to aid in removing the thermal energy.

5. The cooling and heating system of claim 1, wherein the pump comprises a magnetic pump and is coupled to the return conduit.

6. The cooling and heating system of claim 1, wherein the fluid comprises a combination of glycol and distilled water.

7. The cooling and heating system of claim 1, wherein the input conduit, the heat exchanger, the return conduit, and the heat transfer device comprise a closed loop system.

8. The cooling and heating system of claim 7, wherein the fluid is introduced to the closed loop system via a valve assembly coupled to the input conduit.

9. A cooling and heating method, comprising:
coupling together an input conduit, a heat exchanger, a return conduit, and a heat transfer device to form a closed loop, the heat exchanger including a plate, a first section having a first passageway and a second section having a second passageway, the first and second passageways being separated by the plate, the plate having an aperture therethrough and the first passageway being in fluid communication with the second passageway via the aperature;
coupling a first thermoelectric cooler to the first section of the heat exchanger;
coupling a second thermoelectric cooler to the second section of the heat exchanger;
simultaneously cooling or heating both the first passageway and the second passageway using the first and second thermoelectric coolers a fluid within the heat exchanger;
circulating the fluid through the input conduit, the heat exchanger, the return conduit, and the heat transfer device; and heating or cooling an environment adjacent the heat transfer device via thermal energy existing within the fluid while the fluid is flowing through the heat transfer device.

10. The cooling and heating method of claim 9, further comprising forcing air over the heat transfer device via a fan adjacent the heat transfer device.

11. The cooling and heating method of claim 9, further comprising coupling a finned heat transfer structure, external of the heat exchanger, to the first thermoelectric cooler to remove thermal energy from the first thermoelectric cooler.

12. The cooling and heating method of claim 11, further comprising forcing air over the heat transfer structure to aid in removing the thermal energy.

13. The cooling and heating method of claim 9, further comprising controlling the temperature of one side of the first thermoelectric cooler.

14. The cooling and heating method of claim 9, wherein the fluid comprises a combination of glycol and distilled water.

15. A cooling and heating system, comprising:
a heat exchanger; and
a plurality of thermoelectric coolers coupled to the heat exchanger and which can be operable to cool or heat a fluid within the heat exchanger;
wherein the heat exchanger comprises a housing including an upper section having a first passageway and a lower section having a second passageway, the first and second passageways separated by a metal plate, the first passageway being in fluid communication with the second passageway inside the housing.

16. The cooling and heating system of claim 15, further comprising a finned heat transfer structure, external of the heat exchanger housing, coupled to the thermoelectric coolers and which can be operable to remove thermal energy from the thermoelectric coolers.

17. The cooling and heating system of claim 16, further comprising a fan adjacent the heat transfer structure and which can be operable to force air over the heat transfer structure to aid in removing the thermal energy.

18. The cooling and heating system of claim 15, wherein the fluid comprises a combination of glycol and distilled water.

19. The cooling and heating system of claim 15, wherein the copper plate is approximately ¼ inches thick.

* * * * *